US006990285B2

(12) United States Patent
Schroeder et al.

(10) Patent No.: US 6,990,285 B2
(45) Date of Patent: Jan. 24, 2006

(54) METHOD OF MAKING AT LEAST ONE HOLE IN A TRANSPARENT BODY AND DEVICES MADE BY THIS METHOD

(75) Inventors: Joseph F Schroeder, Lindley, NY (US); Alexander Streltsov, Chandler, AZ (US)

(73) Assignee: Corning Incorporated, Corning, NY (US)

( * ) Notice: Subject to any disclaimer, the term of this patent is extended or adjusted under 35 U.S.C. 154(b) by 217 days.

(21) Appl. No.: 10/632,364

(22) Filed: Jul. 31, 2003

(65) Prior Publication Data

US 2005/0025445 A1 Feb. 3, 2005

(51) Int. Cl.
*G02B 6/00* (2006.01)
*C03C 15/00* (2006.01)
*C03C 17/00* (2006.01)

(52) U.S. Cl. ............... 385/137; 385/134; 65/30.11; 65/31

(58) Field of Classification Search ........... 385/134, 385/137
See application file for complete search history.

(56) References Cited

U.S. PATENT DOCUMENTS

| | | | |
|---|---|---|---|
| 5,374,921 A | | 12/1994 | Martin et al. |
| 5,637,244 A | * | 6/1997 | Erokhin ............... 219/121.69 |
| 5,824,127 A | | 10/1998 | Bange et al. |
| 5,879,424 A | | 3/1999 | Nishii et al. |
| 6,128,924 A | | 10/2000 | Bange et al. |
| 6,362,453 B1 | | 3/2002 | Wang et al. ........... 219/121.69 |
| 6,854,872 B2 | * | 2/2005 | Davenport ............... 362/565 |

FOREIGN PATENT DOCUMENTS

JP          03303443     * 11/1991

OTHER PUBLICATIONS

Li et al.: "Three-dimensional Hole Drilling of Silica Glass from the rear Surface with Femtosecond Laser Pulses"; Optics Letter/vol. 26, No. 23; Dec. 2001; pp. 1912-1914.
Marcinkevicius et al.; "Femtosecond Laser-assisted Three-dimensional Microfabrication in Silica"; Optics Letter/vol. 26, No. 5; Mar. 2001; pp. 277-279.

(Continued)

*Primary Examiner*—Michelle Connelly-Cushwa
*Assistant Examiner*—Tina M. Wong
(74) *Attorney, Agent, or Firm*—Svetlana Z. Short

(57) ABSTRACT

A method of making an at least one hole in an optically transparent body comprises the following steps: (i) providing an ultrashort pulse laser for producing a laser output with a wavelength $\lambda$, the laser output having a subpicosecond laser pulse duration; (ii) providing a laser output focusing lens for focusing the laser output, the focusing lens having a numerical aperture NA; (iii) providing an optically transparent body, the optically transparent body having a transparency at $\lambda$ of at least 90%/cm; (iv) providing a liquid filled container situated proximate to the optically transparent body, such that the optically transparent body is in direct contact with the liquid; and (v) directing the laser output through the focusing lens to produce a focused laser output with a subpicosecond laser pulse duration proximate the optically transparent body, wherein the focused laser output traces at least one hole track pattern through the transparent glass body while the optically transparent body and said focused laser output move relative to one another in X-Y-Z directions. The at least one hole track pattern is in contact with the liquid and the focused laser output, in conjunction with the liquid, creates at least one hole in the optically transparent body.

31 Claims, 22 Drawing Sheets

OTHER PUBLICATIONS

Streltsov et al.; "Fabrication and Analysis of a Directional Coupler Wriiten in Glass by Nanojoule Femtosecond Laser Pulses"; Optics Letters/ vol. 26, No. 1; Jan. 2001; pp. 42-43.

Stoian et al.; Abstract of "The Dynamics of Ion Expulsion in Ultrashort Pulse Laser Sputtering of $Al_2O_3$"; Science Direct Web site; May 2000; 2 total pages.

XP008035862: "Three-Dimensional Hole Drillng of Silica Glass From the Rear Surface with Femtosecond Laser Pulses"; Optics Letters, Optical Society of America; vol. 26, No. 23; Dec. 1, 2001; pp. 1912-1914.

XP001019552: "Femtosecond Laser-Assisted Three-Dimensional Microfabrication in silica"; Optical Letters, Optical Society of America; vol. 26, No. 5; Mar. 1, 2001; pp. 277-279.

* cited by examiner

FIG. 1C
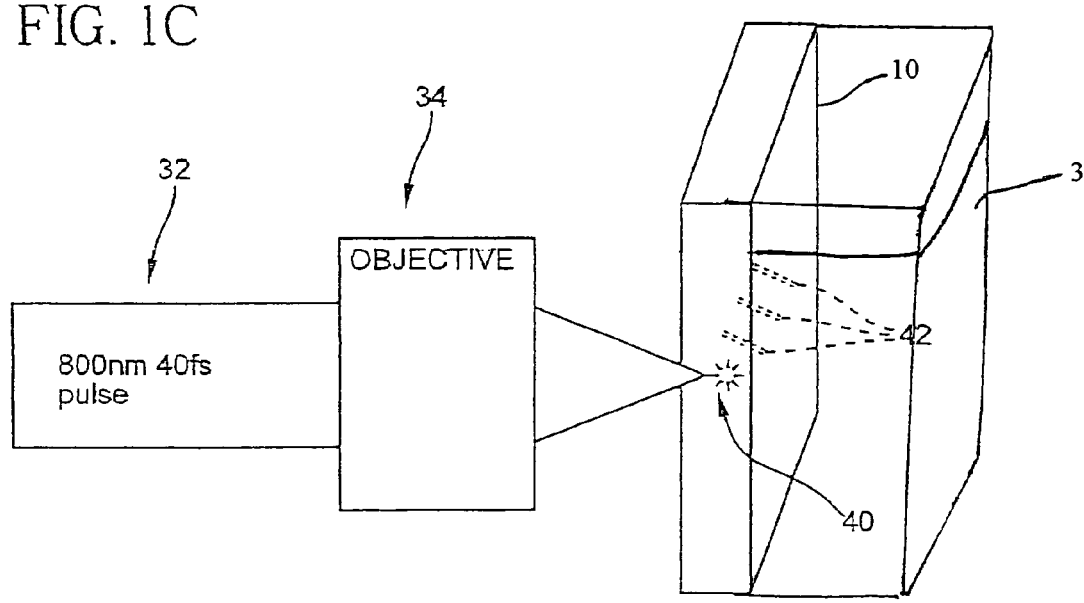
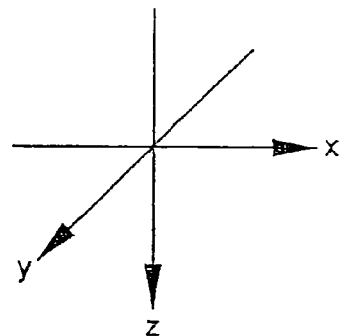

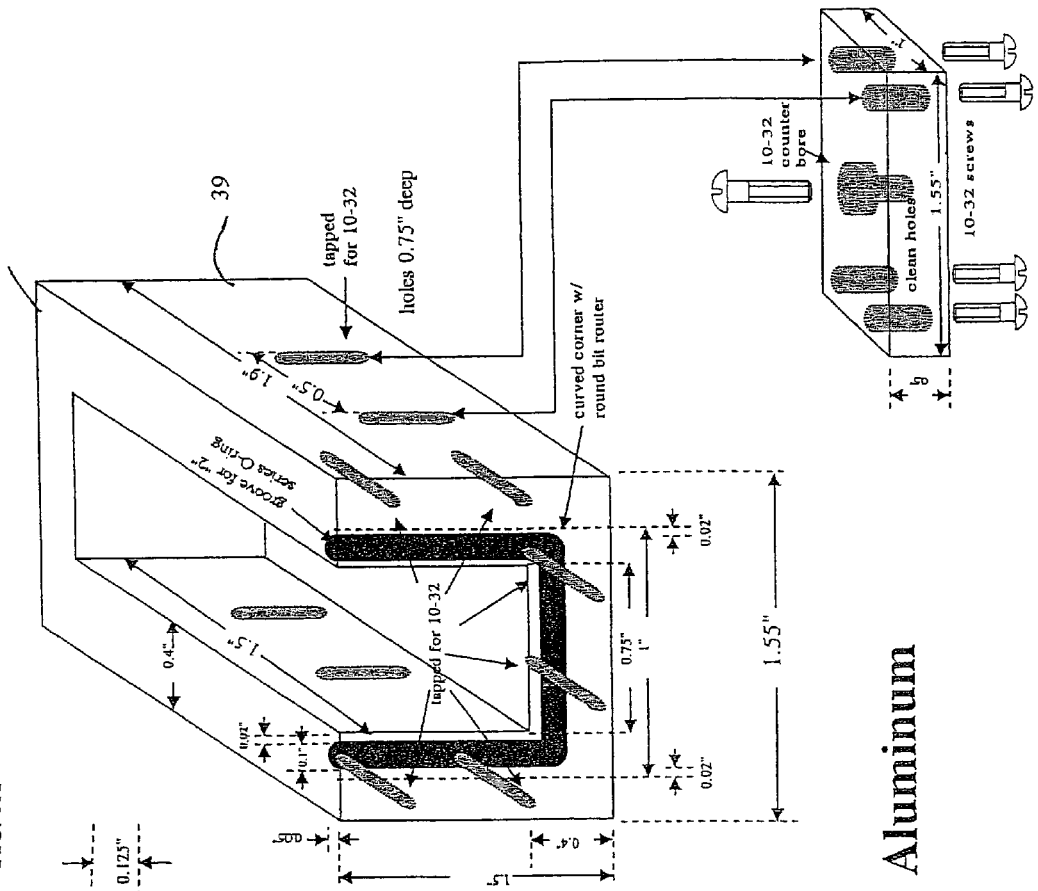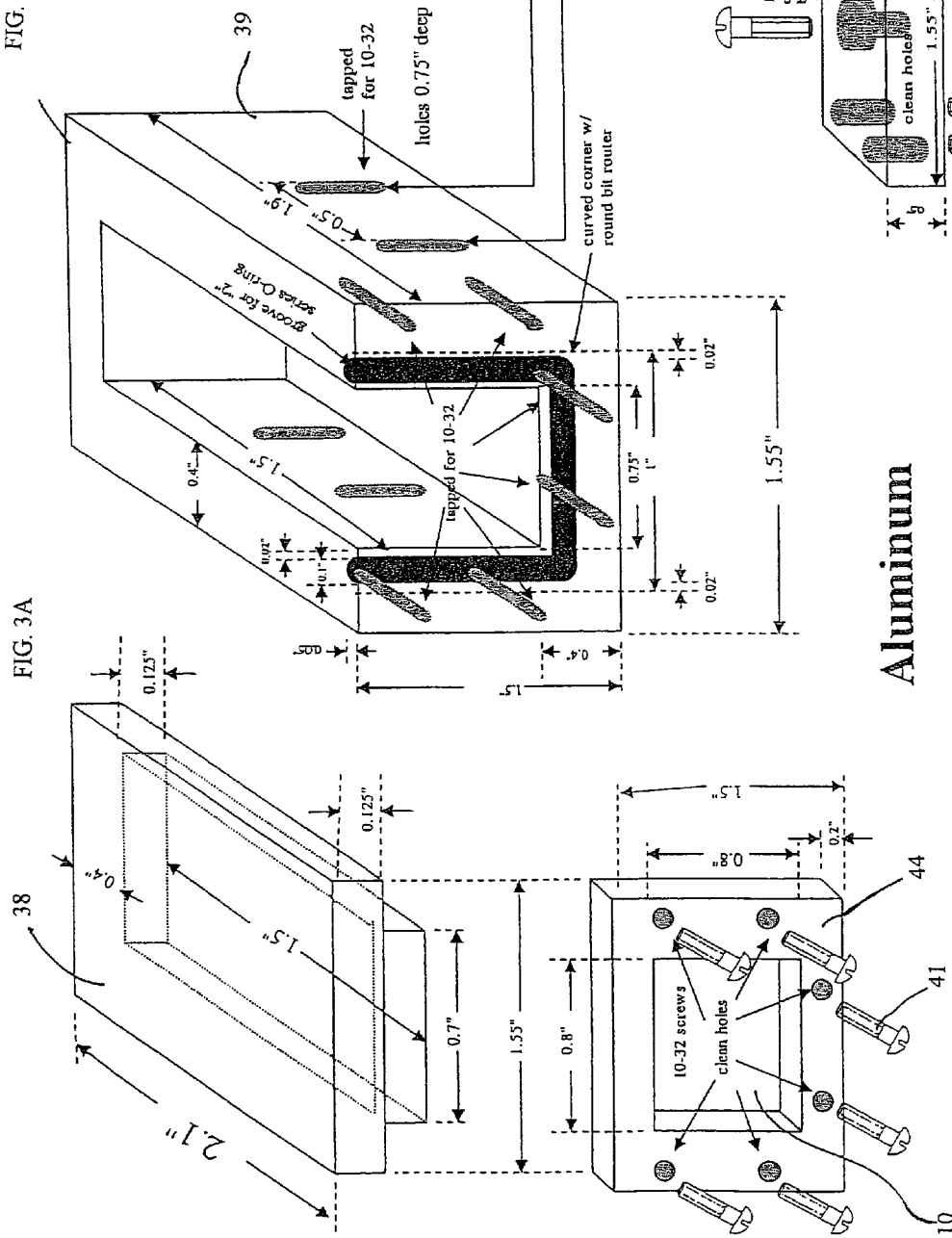

METHOD OF MAKING AT LEAST ONE HOLE IN A TRANSPARENT BODY AND DEVICES MADE BY THIS METHOD

CROSS-REFERENCE TO RELATED APPLICATIONS

This application claims the benefit of, and incorporates by reference, U.S. application Ser. No. 10/183,879, filed Jun. 25, 2002, entitled METHOD OF MAKING OPTICAL FIBER DEVICES AND DEVICES THEREOF by N. F. Borrelli, J. F. Schroeder, A. Streltsov and E. F. Murphy, which claims priority from the U.S. Provisional Application, Ser. No. 60/303,765, filed Jul. 6, 2001 entitled METHOD OF MAKING OPTICAL FIBER DEVICES AND DEVICES THEREOF, by N. F. Borrelli, J. F. Schroeder, A. Streltsov and E. F. Murphy.

BACKGROUND OF THE INVENTION

The present invention relates generally to a method of wet laser drilling of transparent materials and devices made by this method. The method is suitable for making of optical fiber devices.

In the optical communications field of optical fibers and photonic devices, it is desirable to have optical fibers precisely held and positioned in a photonic material device. Optical communications devices often require the precise holding of optical fibers in a glass material, for example an optical fiber ferrule. In biomedical or chemical fields it is desirable to have well plates that are capable of holding a very small, precisely determined amounts of chemical or biological materials. Well plates are substrays with a plurality of microscopic depressions or cups that can contain various biological samples or test materials.

The article entitled "Femosecond laser-assisted three-dimensional microfabrication in silica" published on Mar. 1, 2001 in Vol. 26, No. 5, OPTICS LETTERS describes a 3-D microfabrication in silica glass. The described process utilizes the steps of (i) writing a 3-D pattern inside silica glass by focused femtosecond (fs) laser pulses and utilizes and (ii) etching the damaged silica glass with HF acid. However, this process is relatively long because it utilizes two consecutive steps and the exposure to acid can be hazardous to human health. Furthermore, the produced holes have large surface irregularities and are very short (maximum length is about 120 $\mu$m)

The article entitled "Three dimensional hole drilling of silica glass from the rear surface with femptosecond laser pulses" published on Dec. 1, 2001 in Vol. 26, No. 23, OPTICS LETTERS describes a single step 3-D microfabrication in silica glass that does not utilize HF acid. This article describes the use of the shutter-interrupted focused laser beam in conjunction with water. The shutter was utilized to purposely introduce delay periods in the process, to allow inflow of water into the hole. Thus, because of the purposely introduced delays delay periods, this process was also relatively long. In addition, this method results in very small holes (21 $\mu$m or smaller) in diameter and relatively short hole length (600 $\mu$m or less). The article does not teach nor suggests how to drill wider and/or longer holes.

SUMMARY OF THE INVENTION

One advantage of the method according to the present invention is an improved micromachining speed of optically transparent materials. Another advantage is that this method does not utilize acids to etch optically transparent materials.

According to the present invention a method of making an at least one hole in an optically transparent body comprises the following steps:

(i) providing an ultrashort pulse laser for producing a laser output with a wavelength $\lambda$, the laser output having a subpicosecond laser pulse duration;

(ii) providing a laser output focussing lens for focussing the laser output, the focusing lens having a numerical aperture NA;

(iii) providing an optically transparent body, the optically transparent body having a transparency at $\lambda$ of at least 90%/cm;

(iv) providing a liquid filled container situated proximate to the optically transparent body, such that the optically transparent body is in direct contact with the liquid; and (v) directing the laser output through the focusing lens to produce a focused laser output with a subpicosecond laser pulse duration proximate the optically transparent body, wherein the focused laser output traces at least one hole track pattern through the transparent glass body while the optically transparent body and said focused laser output move relative to one another in X-Y-Z directions. The at least one hole track pattern is in contact with the liquid and the focused laser output, in conjunction with the liquid, creates at least one hole in the optically transparent body.

According to one embodiment of the invention the method also includes the steps of: providing a controllable positioning translation stage; positioning the optically transparent body within the stage, and translating said optically transparent body relative to location of said focused laser output.

According to one embodiment of the present invention the focusing lens has a numerical aperture NA$\leq$1.0 and a working distance of 3 mm or larger.

According to one embodiment of the invention this method is utilized to make optical fiber devices for holding optical fibers and includes the step of inserting an optical fiber into the optical fiber receiving hole to provide a hole contained optical fiber.

According to one embodiment of the present invention the method can be utilized to make a plurality of precision holes through a thick bulk oxide glass body with a thickness of at least 0.25 mm. It is preferable that this thickness be 1 mm or larger.

According to one embodiment the method results in making an optical device, such as an optical fiber holder or a well plate. This method can be utilized to make a bulk optically transparent body containing at least one laser traced hole track pattern traversing through the bulk optically transparent body.

Additional features and advantages of various embodiments of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

BRIEF DESCRIPTION OF THE DRAWINGS

FIGS. 1A–1C show embodiments of the present invention.

FIG. 2 illustrates an exemplary frame supporting optically transparent body.

FIGS. 3A and 3B illustrates an exemplary cuvette for holding a liquid.

DETAILED DESCRIPTION OF THE PREFERRED EMBODIMENTS

Reference will now be made in detail to the present preferred embodiments of the invention. These embodiments are illustrated in the accompanying Figures.

The invention relates to a method of wet laser drilling of transparent bodies 10 such as, for example, glass or sapphire. This method may be advantageously used for making optical devices described further down in the specification. The optical devices may be, for example, optical fiber devices for holding optical fibers, such as optical fiber ferrules.

Figure 1A:
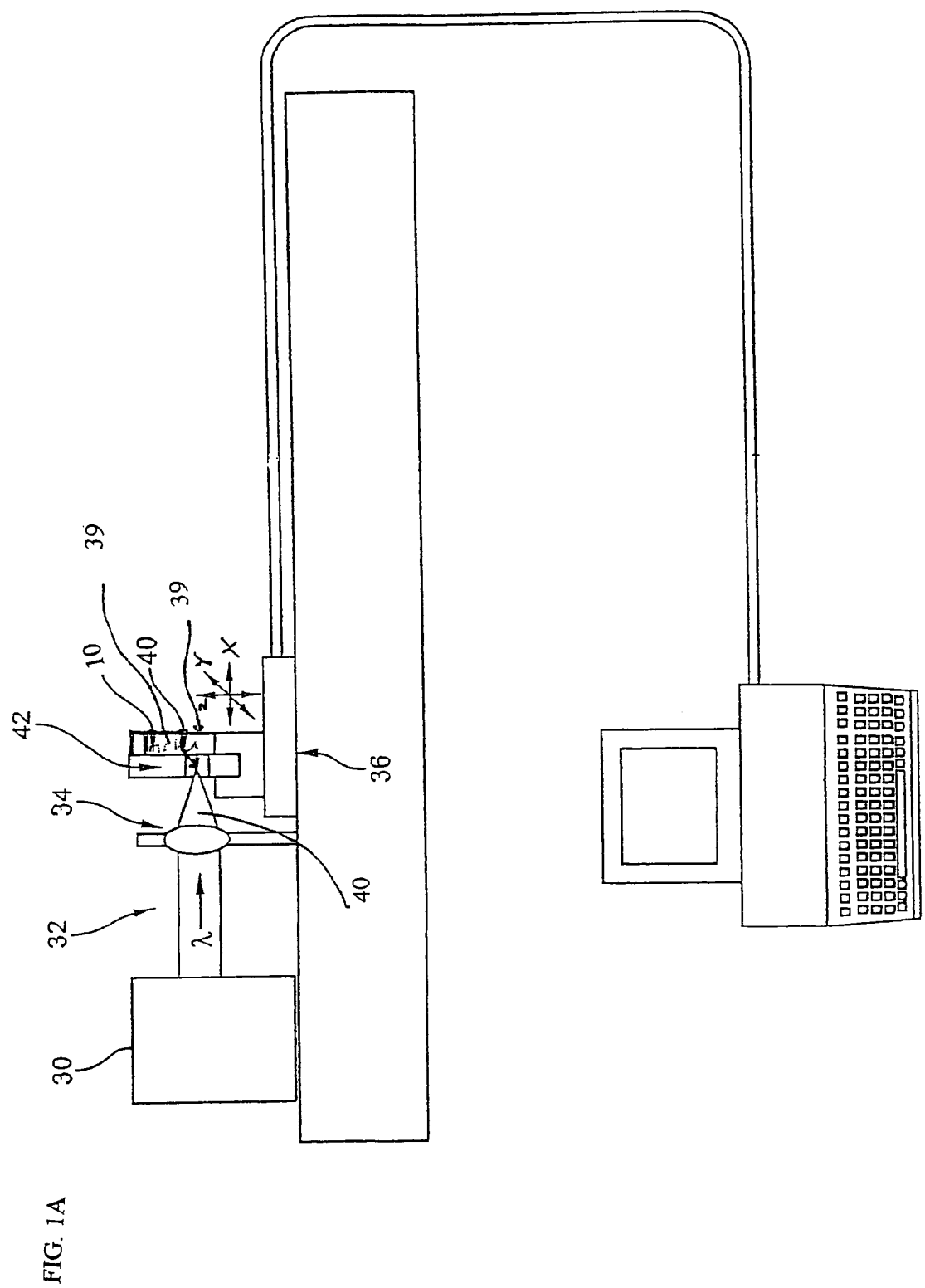
Figure 1B:
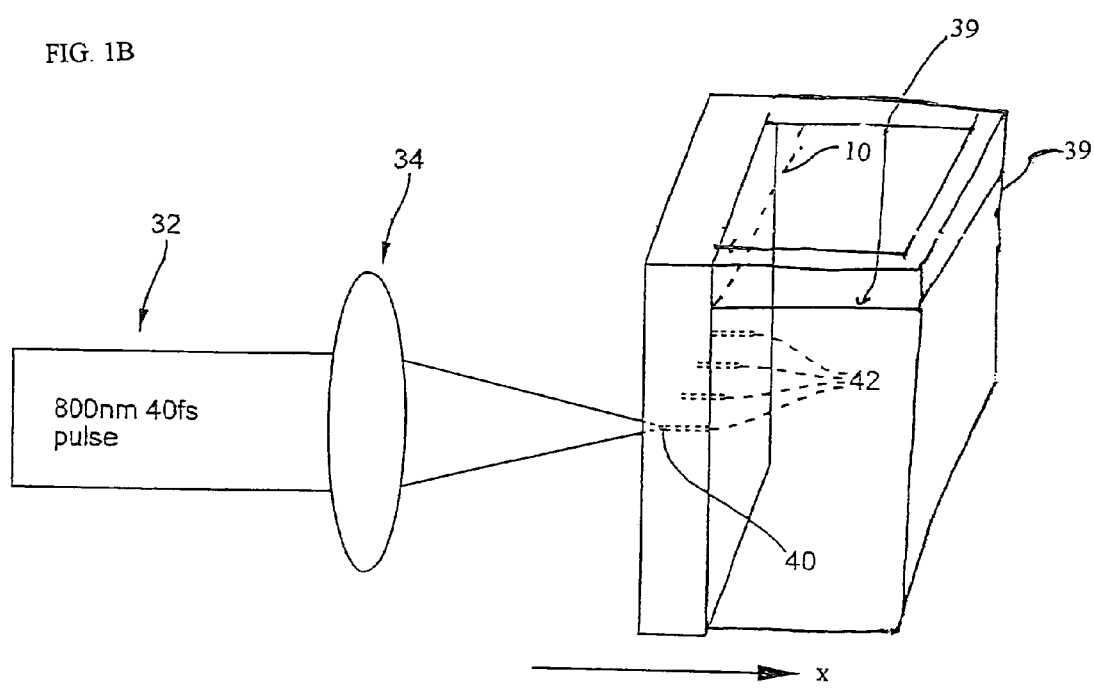

As shown in FIGS. 1A–1C, the method includes providing an ultrashort pulse laser 30 for producing a laser output 32 with a wavelength λ with the laser output having a subpicosecond laser pulse duration. It is preferable that the optically transparent body 10 has a λ transparency of at least 90%/cm and preferably ≧95%/cm, preferably with an absorption at λ which is $<5 \cdot 10^{-2}$ cm$^{-1}$. Preferably, optically transparent body has a bulk thickness of at least 0.5 mm, more preferably 1 mm, and most preferably at least 2 mm.

The method further includes providing a laser output focusing lens 34 for focusing laser output 32. In this example, the lens 34 has an air working distance ≧3 mm and a numerical aperture NA, with NA≦1.0 numerical aperture. It is more preferable that numerical aperture NA be ≦0.5. It is preferable that the numerical aperture be small to enable the focusing lens to gather and, thus to concentrate more laser energy, by being able to handle a wider diameter laser beam. The working distance of more than 3 mm enables the drilling of relatively thick transparent bodies (3 mm thick, or larger). The working distance is defined herein as the distance between the last surface of the lens (facing the focus or the image) and the focus/image. Preferably the laser output focusing lens 34 has a working distance between 3 mm and 30 mm, and a numerical aperature NA between about 0.26 and 0.5, more preferably between 0.28 and 0.5.

It is preferable that the position of the transparent body 10 and the position of the focus/image provided by the focusing lens 34 be adjustable relative to one another. In this embodiment, the method of making at least one hole in the transparent body 10 includes the step of providing a computer controllable positioning translation stage 36 for receiving an optically transparent body 10, for example, an oxide bulk glass body or a bulk sapphire body. In this embodiment, the accuracy of micromachining or laser pulse drilling is limited mainly by motion precision of the stage 36 (less than 0.1 μm). According to an embodiment of the present invention, the transparent body 10 has a transparency at λ of at least 90%/cm. The optically transparent body 10 is provided to the XYZ stage 36 and is received by the stage 36. In this embodiment, the glass body 10 is an oxide bulk glass body. A liquid filled container 39 is situated proximate to the optically transparent body 10, such that at least a portion of the optically transparent body 10 is in direct contact with the liquid 39'. In this embodiment, the container 39 is an aluminum cuvette and the liquid is water. It is preferable that the liquid 39' contain at least one surfactant. In this embodiment the stage 36 also supports the cuvette 39, such that the optically transparent body and the cuvette are moved together, as required, by the translation stage 36. In this embodiment, the internal dimensions of the cuvette 39 are 0.75"×1.5"×1.5". The laser output 32 is directed through the focusing lens 34 and is focused at the focus position 40 proximate the optically transparent body 10, or is imaged onto this location. It is preferable that the image position, or the focus position 40 be placed either on the surface of the optically transparent body 10 which is in direct contact with the liquid 39' or, preferably, at the liquid, just behind this surface. The focused laser light 40' is of high intensity and has a subpicosecond pulse duration. The short duration of the ultrashort pulses help to reduce the heating of the optically transparent body 10. We also found that the shorter the laser pulse, the finer is the granularity of the resulted structure. That is, the shorter the pulses, the finer is the smoothness of the surfaces surrounding the holes or indentations. The optically transparent body 10, together with the liquid filled cuvette 39 is translated relative to focus position 40 wherein focused laser light 40' traces a hole track pattern 42 through the optically transparent body 10. In at least some of the devices the focused laser light is traced at least 0.25 mm through the thickness of glass body 10, with the trace length hole equaling the thickness length. The laser focus traced hole track pattern 42 may be, for example, 0.5 mm to 10 mm long.

Thus, as shown in FIGS. 1A–1C the method of drilling holes in an optically transparent body 10 such as glass includes: (i) positioning of a liquid (for example water) directly adjacent to the optically transparent body 10, and (ii) utilizing the focused energy pulses to drill holes in (or to oblate the material of) the optically transparent body 10 while removing debris with water, or other liquid. In addition, in silica (Si) based glasses, the water may also react with the glass in the drilled area (along the hole track) and speed up the drilling process.

Figure 4:
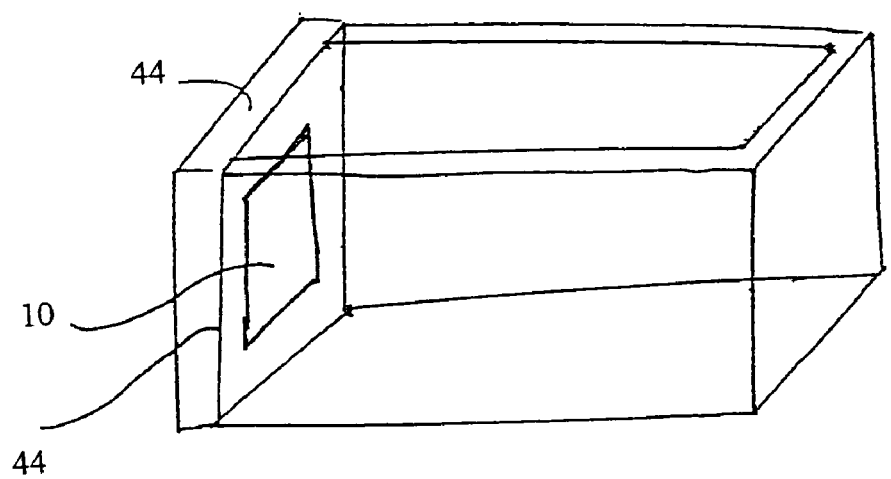
FIG. 4 shows a cuvette of FIGS. 3A and 3B abutting the frame of FIG. 2.

As shown in FIGS. 2, 3A, 3B and 4, the method includes providing a container 39 for holding the liquid 39'. The container 39 is designed to be mountable on the X-Y-Z stage. In this embodiment the container 39 is a cuvette with a removable lid 38 and is open on one side (the side that will be facing the optically transparent body 10). This is illustrated in FIG. 2. The optically transparent body 10 is mounted onto a frame 44 (FIG. 3). The frame 44 and the container's wall 44' surrounding the side opening are abutted together, as illustrated in FIG. 4, forming a sealed container for the liquid 39'. The container 39 is preferably anodized to prevent light reflections. The frame 44 and the container 39 are held together by a set of screws 41. Alternatively, the optically transparent body 10 may be sealed directly to the container wall 44'. Thus, at least one portion of the glass body 10 is in contact with a liquid when the focused traced hole track pattern 42 is cut to form a hole, such as an optical fiber receiving hole 46.

Figure 5A:
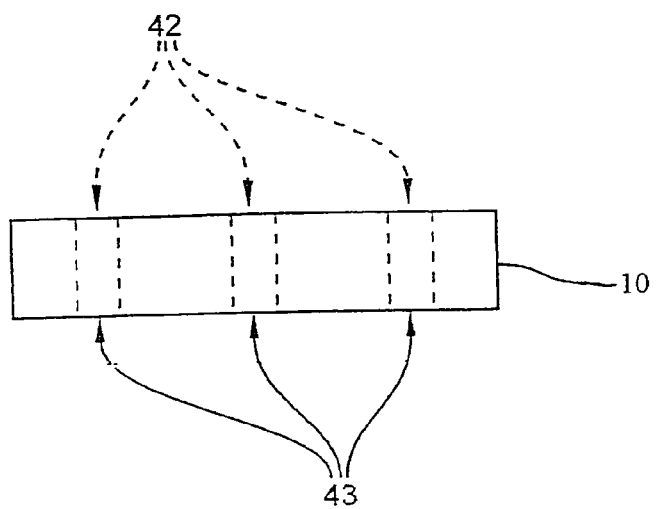
FIGS. 5A and 5B illustrate schematically an optically transparent body with a plurality of shell hole tracks.
Figure 5B:
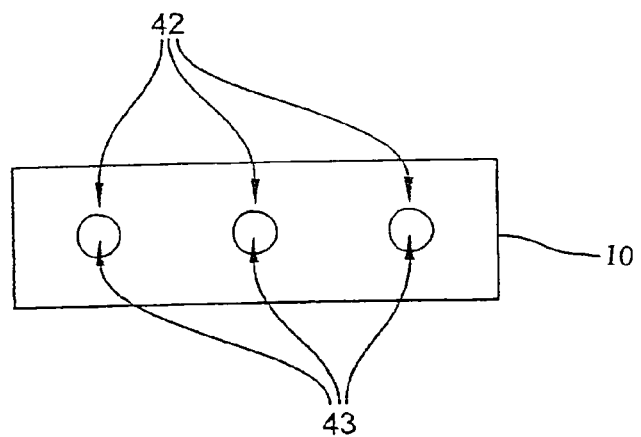
Figure 6:
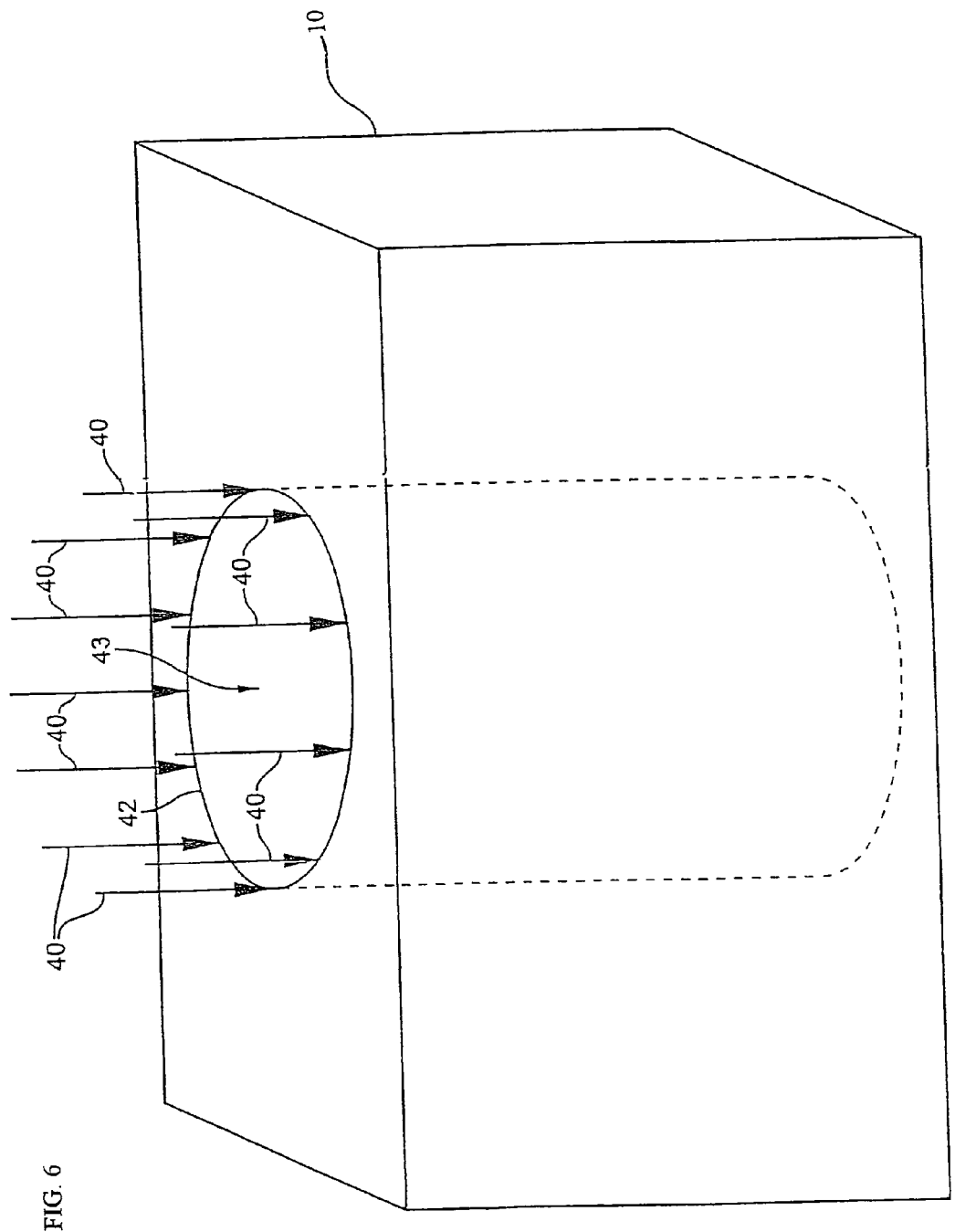
FIG. 6 illustrates an optically transparent body with a shell hole track formed by the moving laser focus.
Figure 7A:
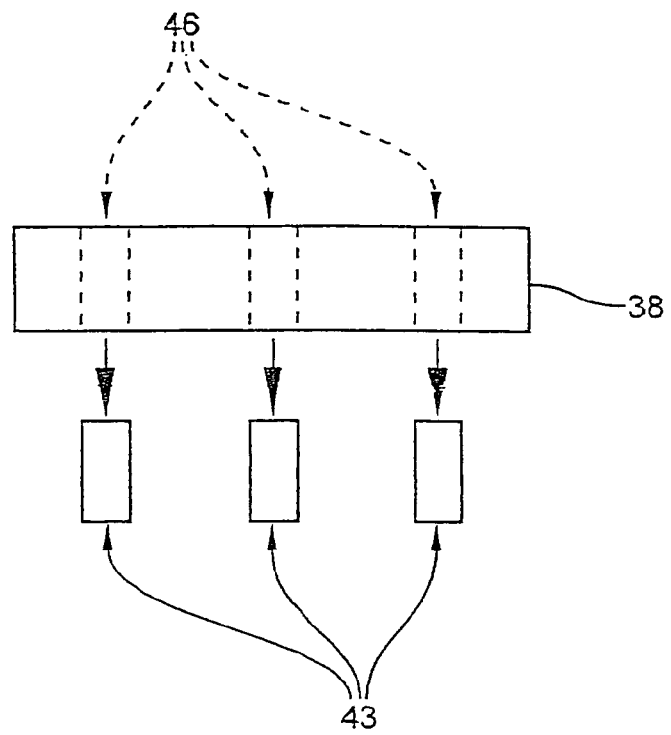
FIG. 7A illustrates schematically an optically transparent body and the columnar material separated (by oblation) and removed from this optically transparent body.
Figure 7B:
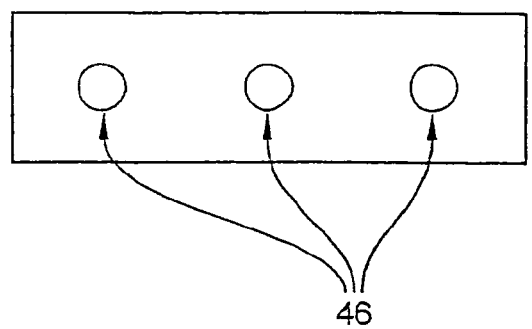
FIG. 7B illustrates the optically transparent body with a plurality of cylindrical holes.
Figure 7C:
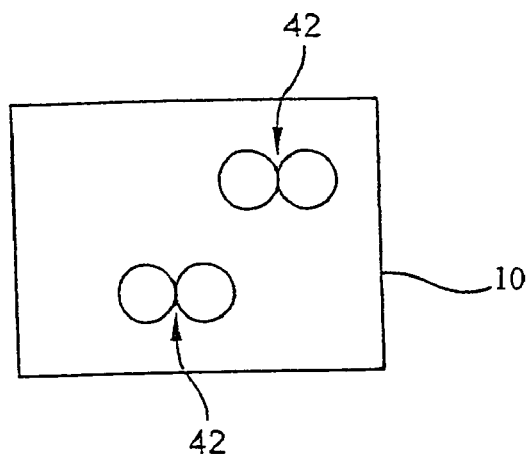
FIGS. 7C–7G illustrate schematically different examples of hole track pattern placement.
Figure 7D:
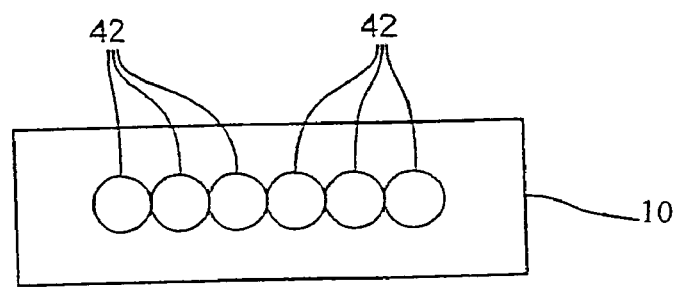
Figure 7E:
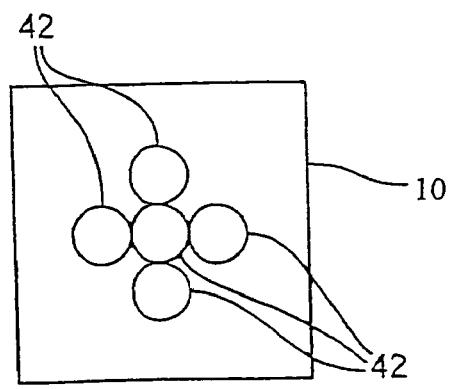
Figure 7F:
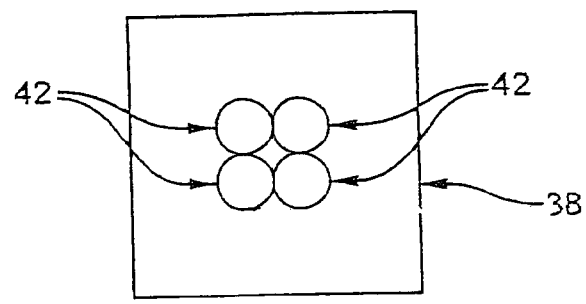
Figure 7G:
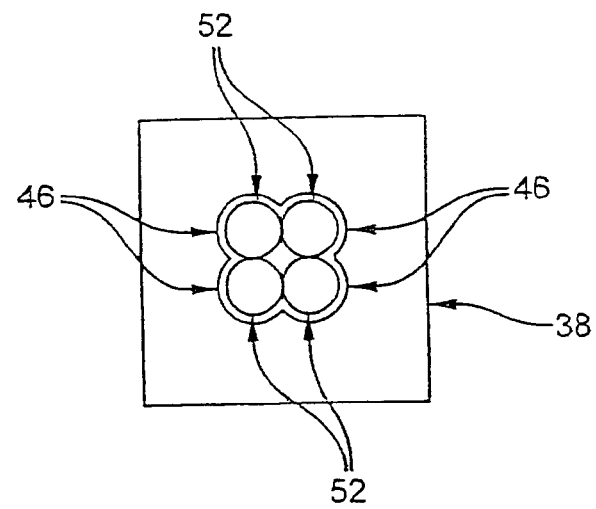
Figure 8A:
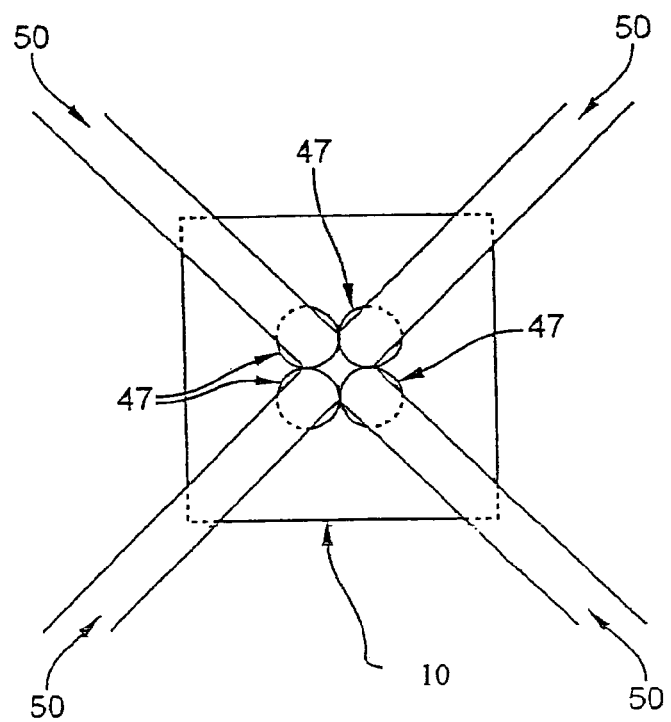
FIGS. 8A–8B illustrate hole contained fibers received by the laser drilled holes in an optically transparent body.
Figure 8B:
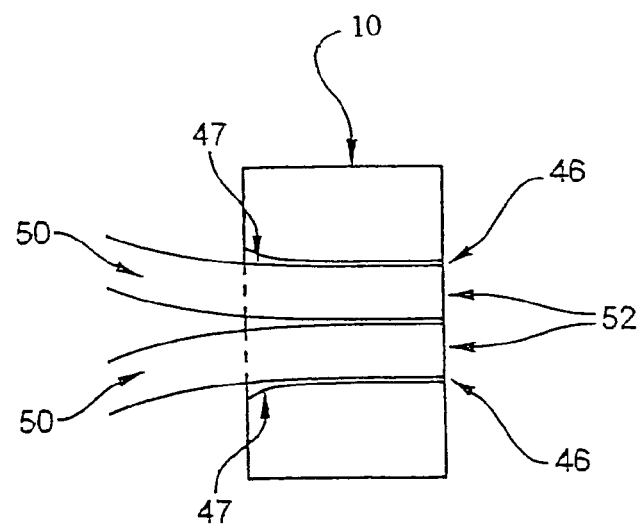

The step of tracing hole track 42 through optically transparent body 10 preferably includes tracing an outline shell hole track 42 such as shown in FIGS. 5A, 5B, and 6 where the outline shell hole track 42 surrounds an unexposed center glass volume 43. As shown in FIGS. 5A, 5B and 6, traced outline shell hole track 42 has columnary cylinder shell geometry and the ablation of material separates the surrounded unexposed cylinder 43 from its surrounding optically transparent body 10 with the unexposed center glass volume 43 removed as shown in FIGS. 7A and 7B to provide precise optical fiber receiving hole 46. In one exemplary embodiment two adjacent outline shell hole track patterns are traced to form a figure eight doublet for receiving and positioning two optical fibers adjacent to on another, such as shown in FIG. 7C. In other embodiments more than two adjacent outline shell hole track cylinders are traced adjacent to one another in a series or matrix to provide for the reception and positioning of a plurality of optical fibers adjacent to one another in a predetermined series or matrix pattern, such as shown in FIGS. 7D–7G. The adjacent traced outline shell hole tracks 42 of FIG. 7G result in optical fiber receiving holes 46 for hole contained optical fibers 52 as shown in FIGS. 8A and 8B. As shown in FIGS. 8A and 8B, at the backside fiber insertion entrance of optically transparent body 10 the fiber receiving holes 46 include a tapered fiber funnel 47 for facilitated insertion of fiber 50 into fiber receiving holes 46.

Figure 9A:
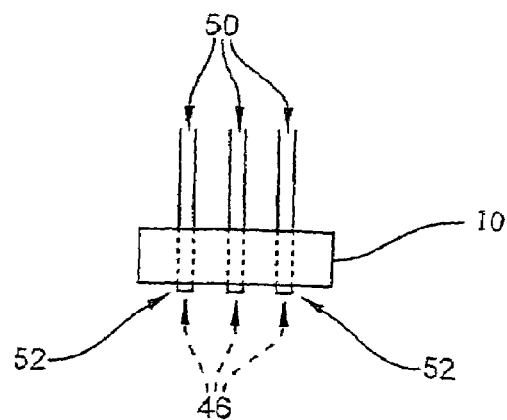
FIGS. 9A–9B illustrate an optically transparent body with a plurality of hiles, each containing an optical fiber.
Figure 9B:
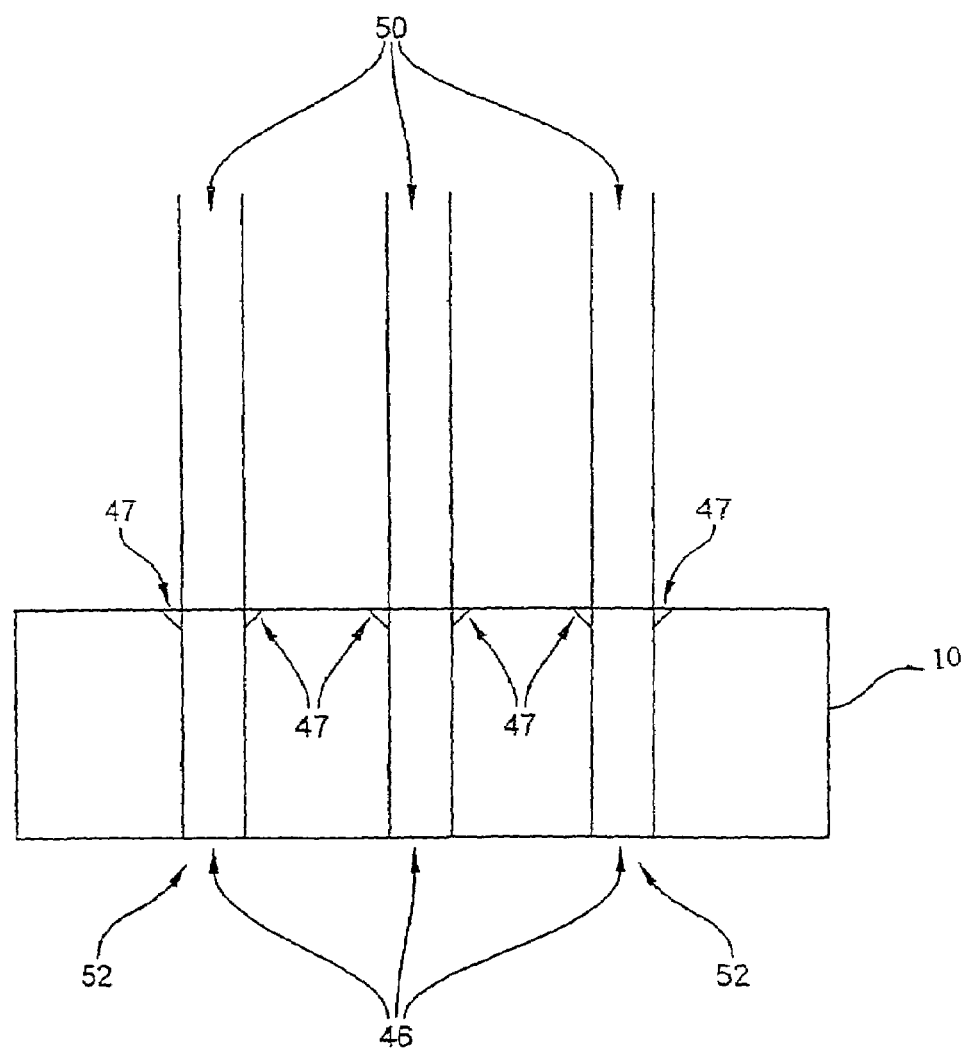

Thus, as shown in FIGS. 9A and 9B the method of making an optical fiber device also includes the step of inserting an optical fiber 50 into optical fiber receiving hole 46 to provide a hole contained optical fiber 52.

In one embodiment, the step of providing ultrashort pulse laser 30 includes providing a laser with a laser output 32 having a <100 fs laser pulse duration. More preferably, the laser pulse duration is <50 fs, and even more ≦40 fs. The step of providing ultrashort pulse laser 30 preferably includes providing pulse energy laser which produces a laser output 32 having a ≧4 µJ pulse energy. For holes of 125 µm diameter or smaller, it is preferable that laser output 32 has ≧7.5 µJ and ≦25 µJ, preferably ≦20 µJ. Larger diameter holes may be drilled with stronger lasers because the larger diameter irradiation pattern enables the adjacent liquid to cool and to fully penetrate within the cut channel. The lasing wavelength λ should be within transparency region of the drilled material. Most of the glasses and many of the crystals are transparent to the light in the near infra red region. Therefore it is preferable that the laser output 32 is characterized by a lasing wavelength λ of less than 1000 nm. For example, λ may be in the range of 800±100 nm, and may be centered about 800 nm. However, other lasers, preferably NIR (near infra-red) lasers may also be utilized.

The process of drilling transparent materials using NIR lasers is based on ablation. At a NIR laser wavelength (λ=800 nm in our case) glasses and crystals are transparent to this wavelength, so that the laser output 32 does not cause heating and melting of the material. In order to produce ablation, we utilize the effect of nonlinear absorption, which takes place when the laser output 32 is tightly focused and light intensity is so high that multiphoton absorption occurs across the bandgap. Unlike in linear absorption, the nonlinear absorption coefficient grows with intensity and at high intensities (like $10^{15}$ W/cm$^2$ or more) the absorption at the focus position 40 of the laser beam may be several tens of percent of the incident power. Since the focal volume is not more than several tens of cubic micrometer, the density of absorbed power is very high and the material evaporates, bypassing a melting stage. The ablation is a threshold intensity dependent process and the amount of removed material grows with pulse energy (assuming the same intensity). Consequently, nanosecond long pulses would produce more damage in the same material compared with femtosecond pulses of the same intensity. Ablation with nanosecond pulses results in bigger caverns with uneven edges and cracks, while femtosecond pulses do a more precise job without damaging the surrounding areas.

Although we are describe the method of micromachining of the different optically transparent materials that result in micro-holes, the same approach and fabrication conditions apply to drilling and milling of virtually any microstructure. The optically transparent materials may be, for example, various glasses and various crystalline materials (such as crystalline quartz and sapphire, for example).

Figure 10A:
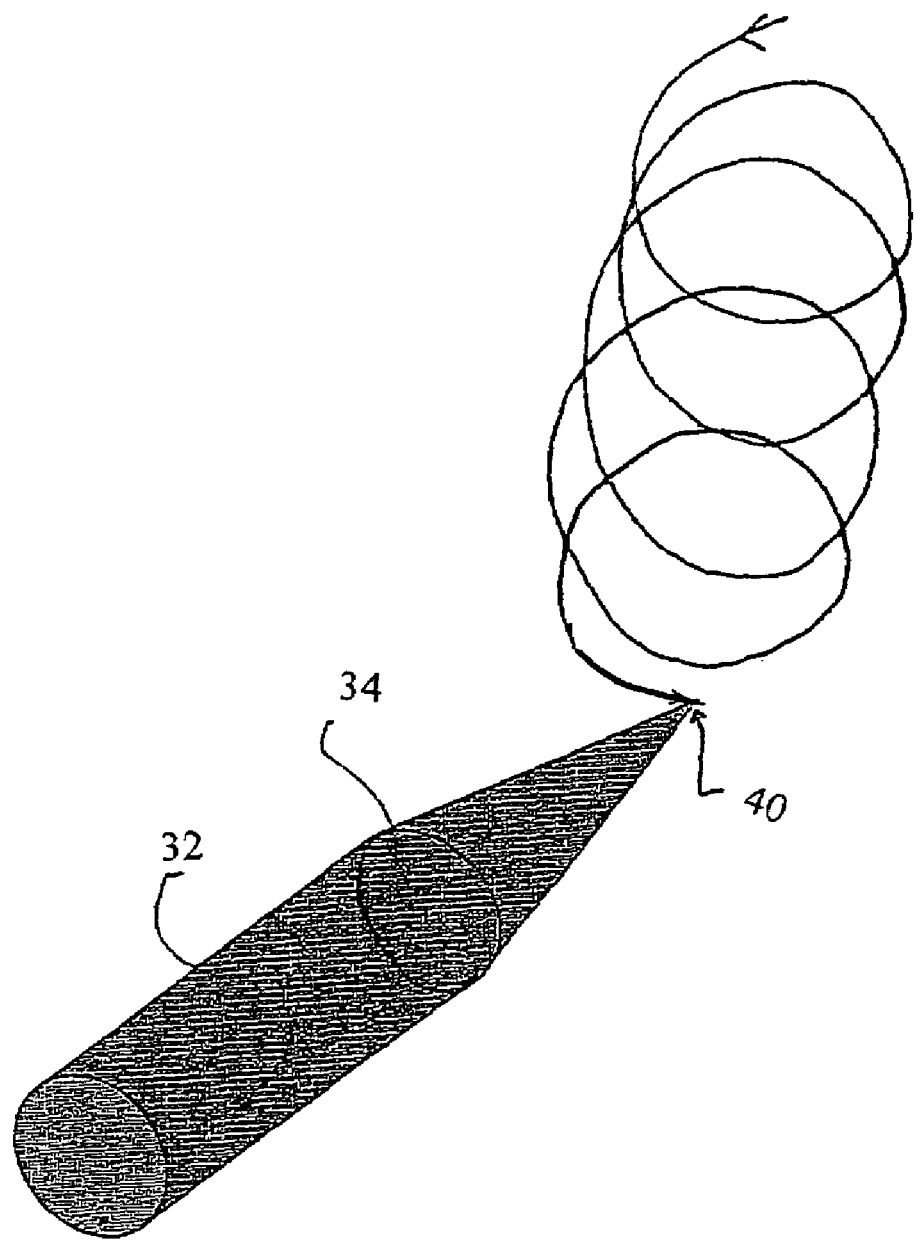
FIG. 10A illustrates a helical irradiation pattern.
Figure 10B:
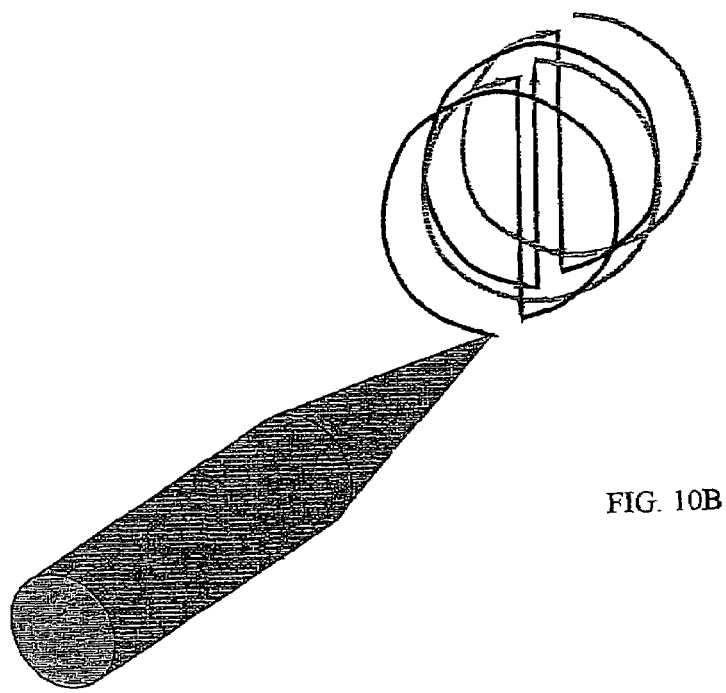
FIG. 10B illustrates an alternative, quasi-helical irradiation pattern.
Figure 10C:
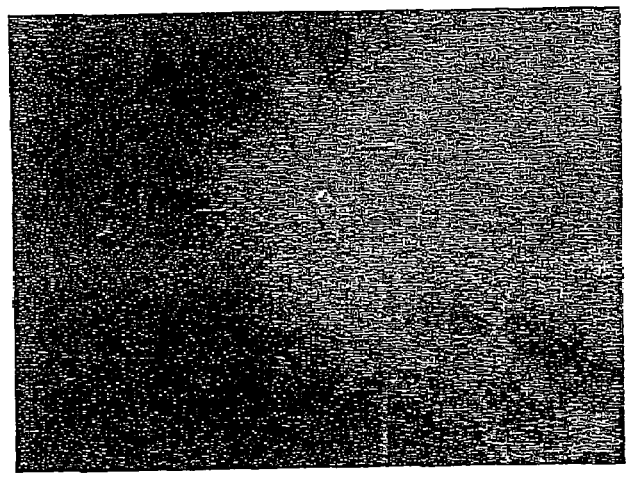
FIG. 10C is a micrograph of a cavity or channel that resulted from the quasi-helical irradiation pattern illustrated in FIG. 10B.

To make a hole one needs to carve a channel in glass that would determine the shape of the hole. In order to make a cylindrical hole the optically transparent body 10 is translated in such a way as to produce a helical or quasi-helical irradiation pattern (also referred herein as a hole track pattern) by the focused laser output. These patterns are illustrated, schematically, in FIGS. 10A and 10B). A helical irradiation pattern should be sufficient to cut the inner cylinder out, but in some optically transparent bodies with thickness exceeding 1.5 mm to 2 mm, the holes were getting clogged with debris. In these optically transparent bodies, in order to enable better liquid convection and flushing of the holes, as they were being drilled, we modified the helical track pattern by introducing a vertically cut channel within this pattern (FIG. 10B). The vertically cut channel within the overall helical track pattern improved the liquid convection and helped to resolve the problem of clogged holes. Thus, as shown in FIG. 10B, in this embodiment, the hole track pattern has a vertically divided cross-section. The micrograph of a carved channel is shown in FIG. 10C.

During irradiation the liquid 39' boils and flushing of debris occurs due to natural convection caused by bubbles raising to the liquid surface and fresh liquid flowing into the cut channel (hole). However, if the bubbles (i) stick to the surface of the optically transparent body 10, and/or (ii) are big enough, they may prevent flushing of the debris. Thus, in such cases, it is preferable to add a surfactant to water to eliminate sticking of bubbles to the sample surface and to decrease the size of bubbles. One example of such surfactant is dodecyl sulfate sodium sodium dodecyl sulfate, or SDS. Other surfactants may also be used. We also discovered that adding methanol may also improve drilling process. The amounts of both additives are not critical, practically the amount of surfactant (in this embodiment, SDS) in distilled water was close to saturating and this solution was mixed in 50/50 ratio with methanol. More specifically, in one embodiment we added about 5 mil of SDS to 30 mil of water. In addition, because during the hole drilling process the surfactant may be consumed (due to laser light breaking down SDS molecules), we added SDS to water, during the drilling process, as needed.

A typical refractive index for the optically transparent material 10 is 1.45 to about 1.7 In some instances water-based liquids would not work well when the refractive index N of the optically transparent material 10 differed substantially from that of water (n=1.33). This occurs because too much light may be reflected at the glass-water interface. However, when faced with this problem while drilling holes in a display glass (see Table 1, below), we were able to overcome this problem by utilizing dimethyl sulfoxide (DMSO) that has a refractive index of about 1.47 as the liquid 39', instead of using water or a water based solution.

Figure 11A:
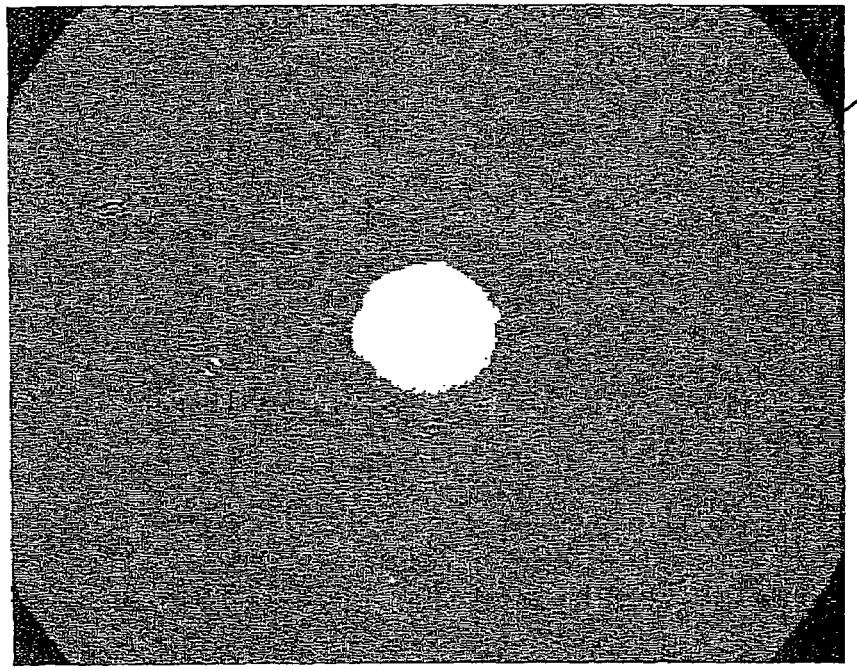
FIG. 11A is a photomicrograph of a glass sample showing a cylindrical hole in the glass body.
Figure 11B:
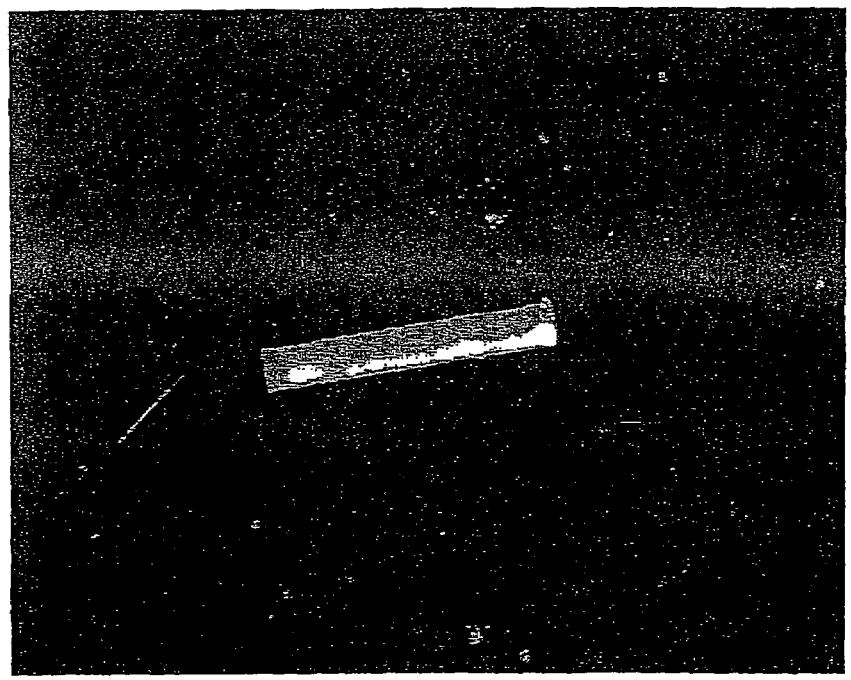
FIG. 11B illustrates a columnar glass volume that was removed from the glass body illustrated in FIG. 11A.

Holes of various predetermined diameters are formed by irradiating laser beam writing a helix-like laser radiation track pattern outline shell hole track that surrounds an unexposed center glass volume. The inner unexposed part surrounded by the surrounding track pattern is then detached from the bulk optically transparent body 10. A 120-$\mu$m diameter cylinder outline shell was irradiated in a 2-mm thick piece. The stage and received optically transparent body 10 was translated to write successive circles to form a cylinder. The diameter of the circles was about 120 $\mu$m, the separation between the planes of the circles was about 2–3 $\mu$m using a 7.5 to 10 $\mu$J pulse energy, 40 fs pulses, 800 nm wavelength, 20 kHz, and 250 $\mu$m/second writing speed. More specifically, in one embodiment we provided, as the optically transparent body 10, a 2-mm thick wafer of HPFS (high purity fused silica). We utilized a simple helical irradiation pattern to produce a hole in this material. FIG. 11A is a microphotograph of this wafer and shows the resultant hole 46. FIG. 11B is a photograph of the pin (i.e., the unexposed glass volume) that came out of this hole 46. The time required to fabricate a 126-$\mu$m diameter hole in this wafer was around 10 minutes. The diameter of the irradiated helix was 110 $\mu$m and the final diameter was larger due to the finite size of a focal spot.

In another example, a 126 $\mu$m hole was drilled in a 2 mm fused silica plate utilizing the above described procedure and using pyrene-acetone mixture for the liquid 39'.

Figure 12:
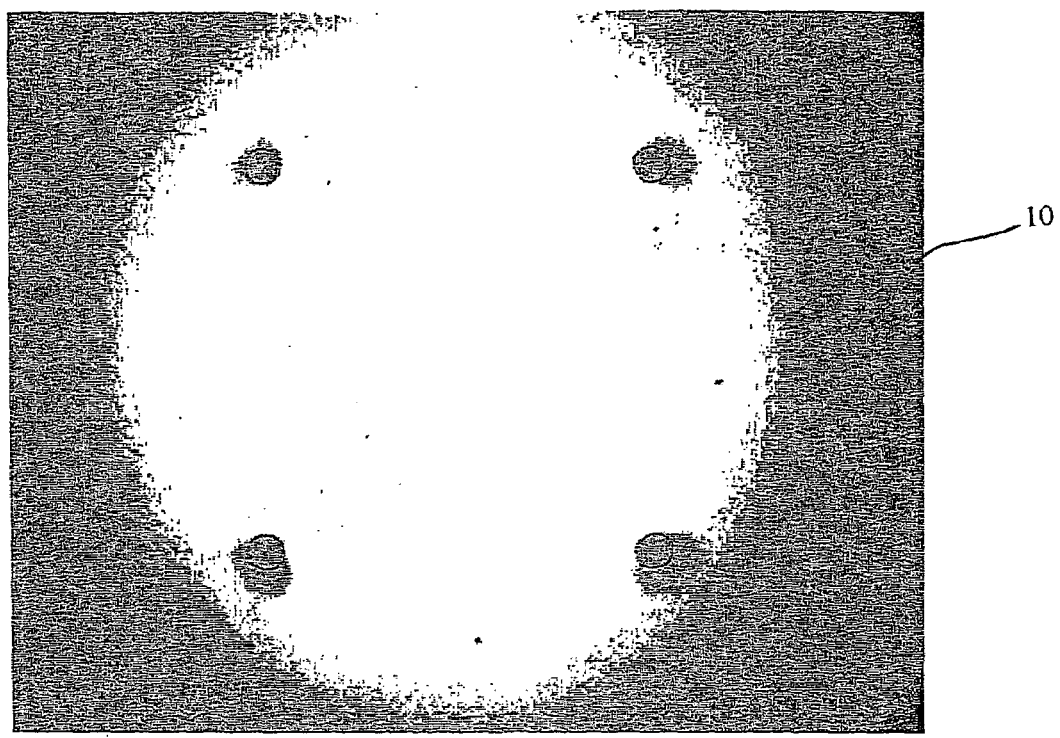
FIG. 12 illustrates an optically transparent body with four holes and with optical fiber inserted into each of the holes.

A photograph of an exemplary two by two, 126 $\mu$m hole array in a HPFS plate is shown in FIG. 12. The optical fibers 52 were then inserted into the holes 46. With the fibers 52 inserted into the holes (and lit) the measured variance of center-to-center distance between the cores of the fibers 52 was 0.7 $\mu$m, while the diameter variance was 0.1 $\mu$m.

Table 1 provides some examples of the drilling conditions for different exemplary glasses and for the crystalline sapphire. The chemical compositions for the exemplary materials are provided further down in the specification. The resulting holes were about 126 $\mu$m in diameter. It is noted that sapphire was very easy to drill although it is one of the hardest materials. The translation speed was relatively high, no additives to distilled water were needed, and a helical track without the vertical channel worked well.

TABLE 1

| MATERIAL | Track pattern | VELOCITY(mm/s) | MIXTURE | STEP* ($\mu$m) | PULSE ENERGY | POWER |
|---|---|---|---|---|---|---|
| High purity fused silica (99.9% Silica) | Helical-line | 0.5–0.7 | 50:50 SDS-$H_2O$/methanol | 3 | 5 $\mu$j | 100 mW |
| Display glass | Helical-line | 0.5 | DMSO | 2 | 10 $\mu$j | 200 mW |
| Pyrex ® | Helical-line | 0.5 | 50:50 SDS-$H_2O$/methanol | 3 | 15 $\mu$j | 300 mW |
| Fotoform ® | Helical-line | 0.12** | SDS-$H_2O$ | 3 | 5 $\mu$j | 100 mW |
| Sapphire (crystal) | Helical | 1 | $H_2O$ | 3 | 20 $\mu$j | 400 mW |

*The step length was measured along the axis of the cylindrical hole.
**Never optimized for speed. The addition of methanol should increase drilling velocity.

We found that by utilizing this method they can cut 125 $\mu$m holes at the velocity of over 5 $\mu$m/s, and preferably over 10 $\mu$m/s. It is more preferable that the cutting speed be over 20 $\mu$m/s and less than 2 mm/s, preferably, less than 500 $\mu$m/s. For larger size holes the preferable cutting velocities may be different. We found that laser beam parameters are important for efficiency of laser drilling. Laser-pulse duration can be tweaked to maximize non-linear absorption and consequently glass ablation. On the other hand, moderate average power, together with proper carving speed, should be optimized for fast ablation without clogging the resulting hole with the debris. When the optical power is excessive ($\geq$20 $\mu$j for glass and 30 $\mu$j for crystal materials, for the hole diameters of 125 $\mu$m) the water convention is not fast enough to clean the hole from the chips, so the choice of ablation speed should be balanced by the speed of convection. We found that laser pulse energies of 7.5–10 $\mu$J and cutting speeds in the range of 50–250 $\mu$m/s. provided very good results in terms of the smoothness of the hole and the speed of drilling. In one exemplary embodiment we were able to drill a through 126 $\mu$m diameter hole in 4 mm thick oxide glass in about 12 minutes.

Examplary Materials

In one example the optically transparent body 10 is an oxide bulk glass body which in this embodiment is a $TiO_2$ containing silica glass body (ULE® glass, available from Corning, Inc, of Corning, N.Y.). In a preferred embodiment, the $TiO_2$ silicon dioxide silica glass body contains from 5 to 10 wt. % $TiO_2$, most preferably with the $TiO_2$ silica glass having an OH content >100 ppm OH wt., more preferably >500 ppm OH wt, preferably with the silica glass being a direct deposit glass which consists essentially of $SiO_2$ and $TiO_2$. In a particularly preferred embodiment the $TiO_2$ silicon dioxide fused silica glass body contains from 6 to 8 wt. %, more preferably form 6.5 to 7.5 wt. %, and most preferably about 7 wt. % $TiO_2$. Preferably the 6 to 8 wt. % $TiO_2$ silicon dioxide fused silica glass body has a CTE in the range of −30 ppb/° C. to 30 ppb/° C. in the temperature range of 5° C. to 35° C.

In another, alternative exemplary embodiment, the optically transparent body 10 is silica glass body and more particularly, a batch melted borosilicate glass, preferably with at least 1% boric oxide, and more preferably at least 3% boric oxide.

In one embodiment the silica glass body is a window glass, such as batch melted soda-lime glass, preferably with at least 1% $Na_2O$ and 1% CaO, and more preferably at least 3% $Na_2O$ and 3% CaO.

In one embodiment the optically transparent body is a display glass of Table 1. More specifically it is a batch melted fusion drawn flat glass, preferably a $B_2O_3$ alumina silica glass, for example, about 50(±5) wt. % $SiO_2$, 15(±5) wt. % Alumina, 7.5(±2) wt. % $B_2O_3$, and 14(±5) wt. % Alkaline earth. The drilling of this glass was facilitated by use of DMSO.

In one exemplary embodiment the oxide bulk glass body 10 may be uncerammed glass-ceramic glass. Preferably the uncerammed glass-ceramic glass with hole track patterns is then cerammed to develop crystals. The oxide bulk glass body 10 may be a photosensitive nucleated glass, (also referred to as Fotoform® in the Table 1 and available from Corning Inc., of Corning, N.Y.) most preferably a photosensitive nucleated glass which forms lithium metasilicate microcrystalline phases, preferably a lithium aluminosilicate glass such as a fotoform lithium aluminosilicate with a composition of about 79(±1) wt. % $SiO_2$, 9.4(±1) wt. % $Li_2O$, 1.6(±1) wt. % $Na_2O$, 4(±1) wt. % $K_2O$, 4(±1) wt. % $Al_2O_3$, 1(±0.5) wt. % ZnO, 0.4(±0.2) wt. % $Sb_2O_3$, 0.015 (±0.005) wt. % $CeO_2$, 0.003(±0.003) wt. % $SnO_2$, 0.001 (±0.0005) wt. % Au, 0.1(±0.05) wt. % Ag.

In one alternative embodiment the uncerammed glass-ceramic glass is cerammed after the formation of the hole(s) in the glass body 38. The uncerammed glass-ceramic glass body 10 may be aluminosilicate glass green body. In one embodiment the uncerammed glass-ceramic glass is a lithium aluminosilicate glass body.

The exemplary uncerammed glass-ceramic glass may contain $TiO_2$ or $TiO_2$ and $ZrO_2$, for example. In one embodiment the glass-ceramic glass body is a lithium aluminosilicate glass body which is cerammable into a negative thermal expansion substrate, preferably with a CTE in the range from $-20 \times 10^{-7}/°$ C. to $-100 \times 10^{-7}/°$ C. in the temperature range of −40° C. to 85° C., more preferably with a $Li_2O$: $Al_2O_3$:$SiO_2$ molar ratioe ranging from 1:1:2 to 1:1:3, and most preferably comprised of 8–12 wt. % $Li_2O$, 30–45 wt. % $Al_2O_3$, 40–60 wt. % $SiO_2$, 3–6 wt. % $TiO_2$, 0–3 wt. % $B_2O_3$, 0–4 wt. % $P_2O_5$. In one embodiment the glass-ceramic glass body is a lithium aluminosilicate glass body which is cerammable into a glass-ceramic with a low average CTE (0–1000° C.) less than about $20 \times 10^{-7}/°$ C., preferably comprised of 3–8 wt. % $Li_2O$, 18–33 wt. % $Al_2O_3$, 55–75 wt. % $SiO_2$, and 3–5 wt. % $TiO_2+ZrO_2$. In one embodiment the glass-ceramic glass body is a lithium aluminosilicate glass body which is cerammable into a glass-ceramic with a mean coefficient of linear thermal expansion of $0\pm0.10\times10^{-6}/K$ (0–50° C.), more preferably mean coefficient of linear thermal expansion of $0\pm0.05\times10^{-6}/K$ (0–50° C.), and most preferably mean coefficient of linear thermal expansion of $0\pm0.02\times10^{-6}/K$ (0–50° C.). Preferably the glass-ceramic lithium aluminosilicate glass body which is cerammable into a glass-ceramic with a mean coefficient of linear thermal expansion of $0\pm0.10\times10^{-6}/K$ (0–50° C.) has a weight percent composition of about 55.5(±1) wt. % $SiO_2$, 25.3(±1) wt. % $Al_2O_3$, 3.7(±1) wt. % $Li_2O$, 1(±1) wt. % MgO, 1.4(±1) wt. % ZnO, 7.9(±1) wt. % $P_2O_5$, 0.5(±0.5) wt. % $Na_2O$, 0.03(±0.03) wt. % $Fe_2O_3$, 2.3(±1) wt. % $TiO_2$, 1.9(±1) wt. % $ZrO_2$, 0.5(±0.5) wt. % $As_2O_3$.

Examples of Devices

Figure 13A:
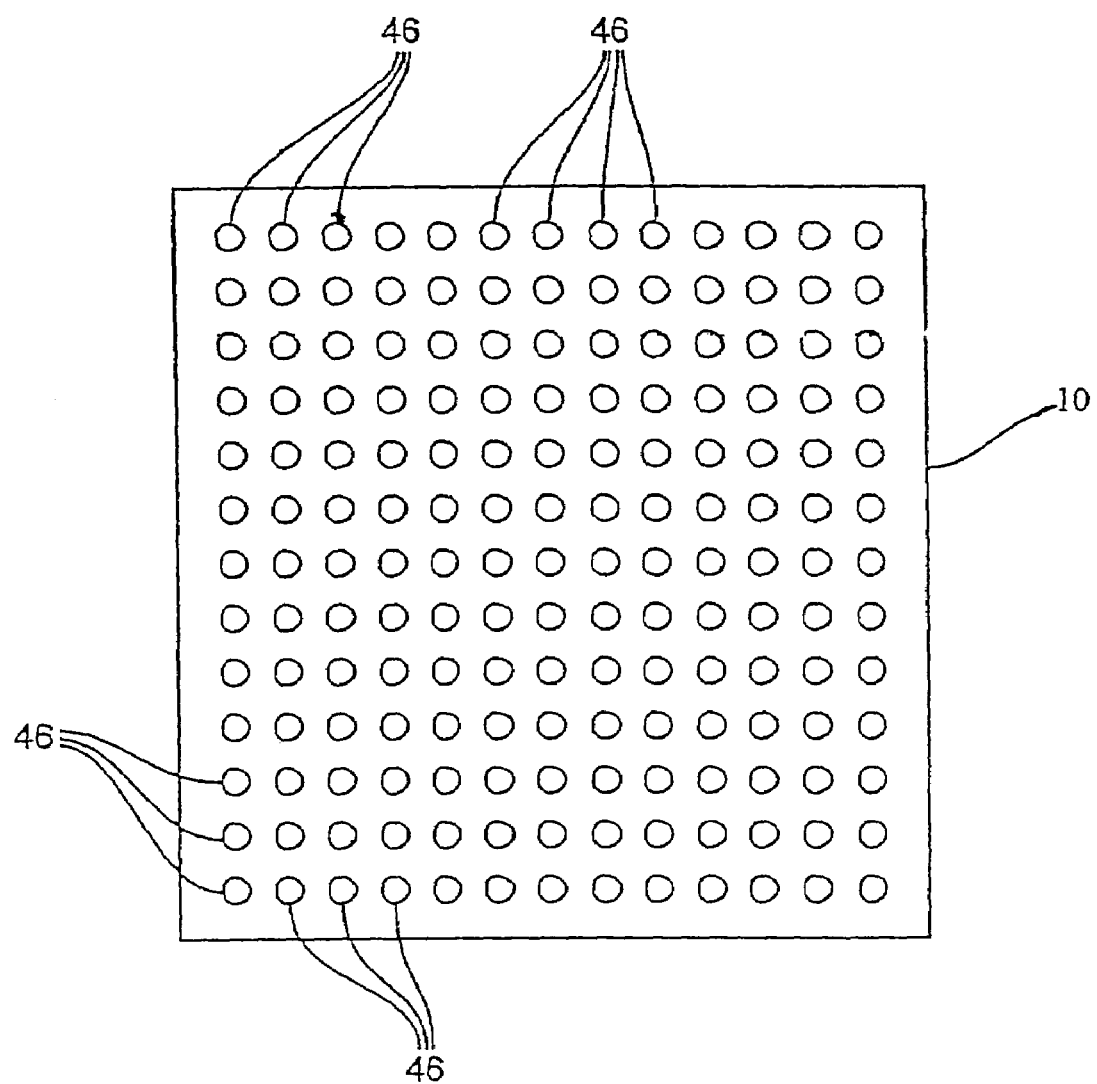
FIGS. 13A–13C illustrate an optical fiber device of one embodiment of the present invention.
Figure 13B:
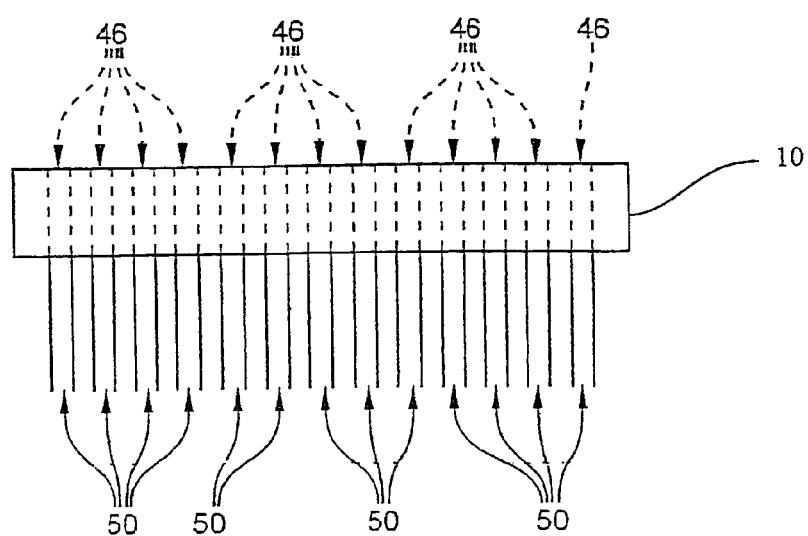
Figure 13C:
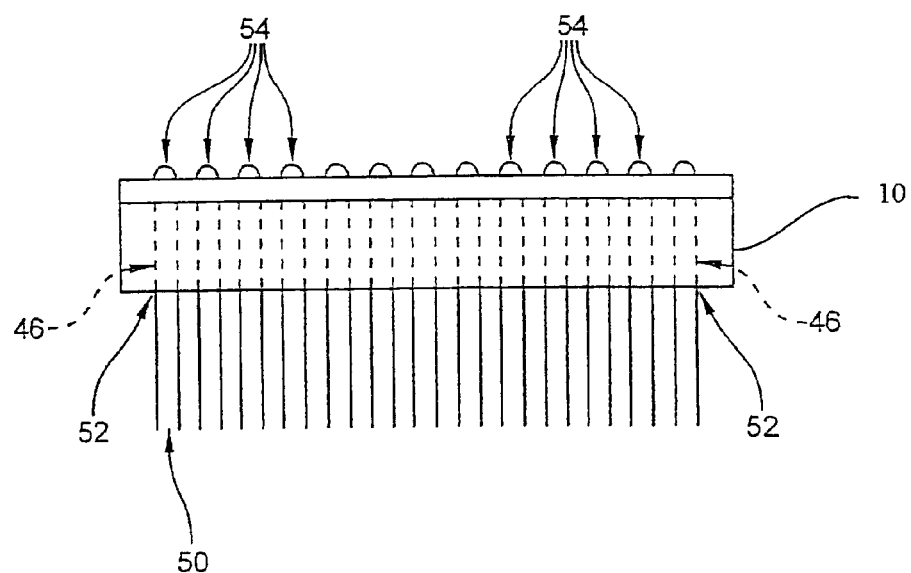
Figure 14A:
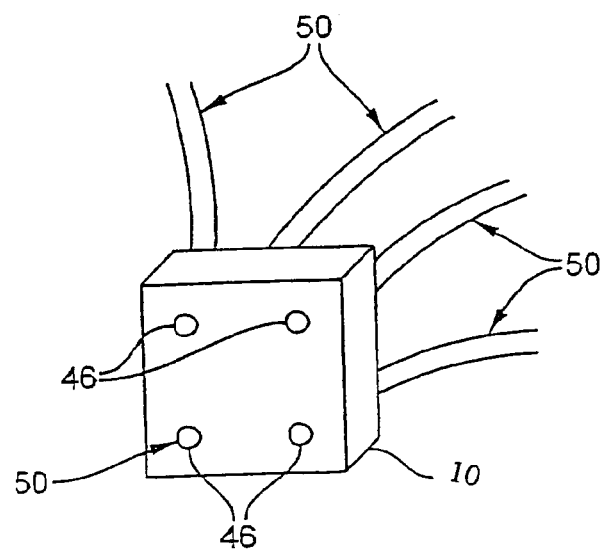
FIGS. 14A–14D illustrate another optical fiber device of one embodiment of the present invention.
Figure 14B:
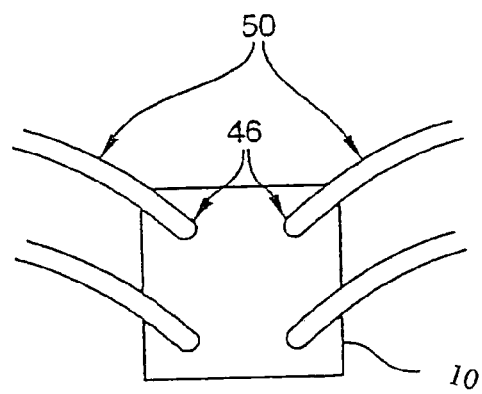
Figure 14C:
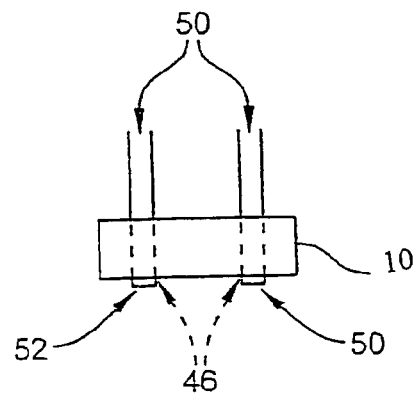
Figure 14D:
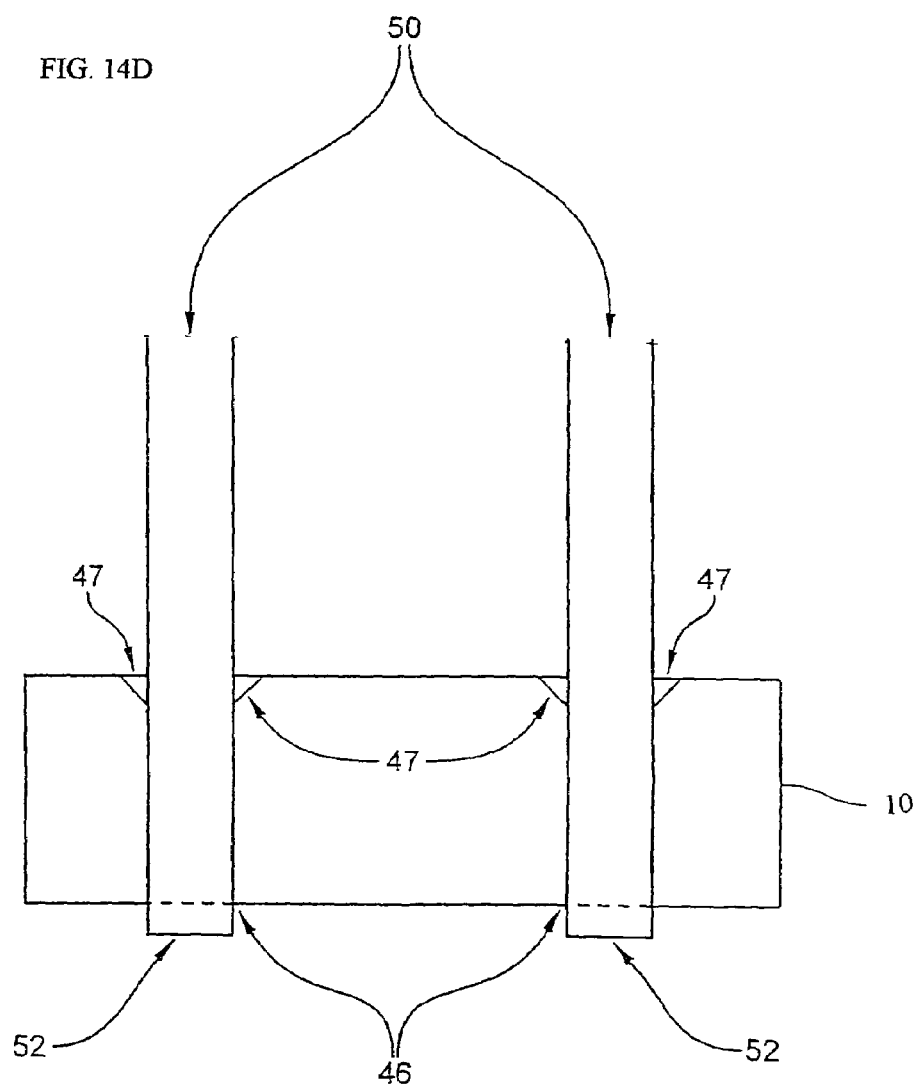

The invention includes methods of making optical fiber devices as well as other devices and the devices produced by the method. An example of an optical fiber device is an optical fiber holder. As illustrated in FIGS. 13A–13C, one embodiment of the invention preferably includes focus tracing a plurality of hole track patterns in predetermined locations in oxide bulk glass body 10 to provide an array of optical fiber receiving holes 46. As shown in FIG. 13C, such a large array of holes 46 are utilized to form an optical fiber lens array with precision formed holes 46 aligned with lenses 54 of the optical fiber lens array such that the holes 46 provide for the alignment of the cores of optical fibers 50 with the optical axis of the lenses 54.

The method of making optical fiber devices may me utilized to provide the devices illustrated in FIGS. 14A–14D. These devices are optical fiber holders that provide an efficient means for precisely aligning a plurality of optical fibers 50 contained in the optical fiber receiving holes 46 of the optically transparent body 10. Such an optical fiber holder device utilizable in an optical fiber photonic device.

Figure 15:
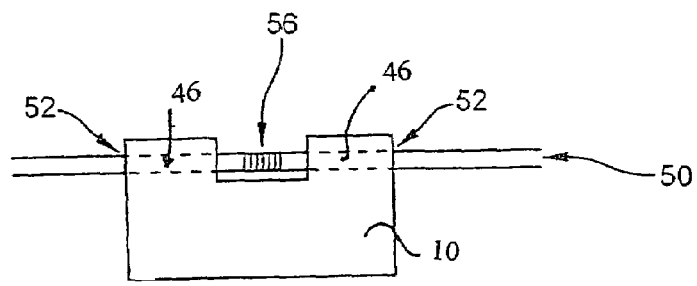
FIG. 15 illustrates yet another optical fiber device of one embodiment of the present invention.

As shown in FIG. 15, the invention can be utilized to make an optical fiber device where the optical fiber is held at two separated places with such a device. More specifically, oxide bulk glass body 10 is preferably an uncerammed glass-ceramic glass and the glass body 10 is cerammed into a negative thermal expansion glass-ceramic. With embodiments such as shown in FIG. 15, the oxide bulk glass body 10 is preferably cerammed into a negative thermal expansion glass-ceramic substrate body such that optical fiber 50 containing fiber Bragg grating(s) 56 are secured within holes 46 with the fibers 50 held under tension. With such embodiments the gratings 56 of the hole contained fibers are athermalized to temperature changes by the negative thermal expansion of the glass-ceramic adjusting the tension of the fiber. Thus, the method of making an optical fiber holder further includes the step of inserting at least one fiber into the hole(s) provided by wet drilling of optically transparent body 10, as described above.

Figure 16:
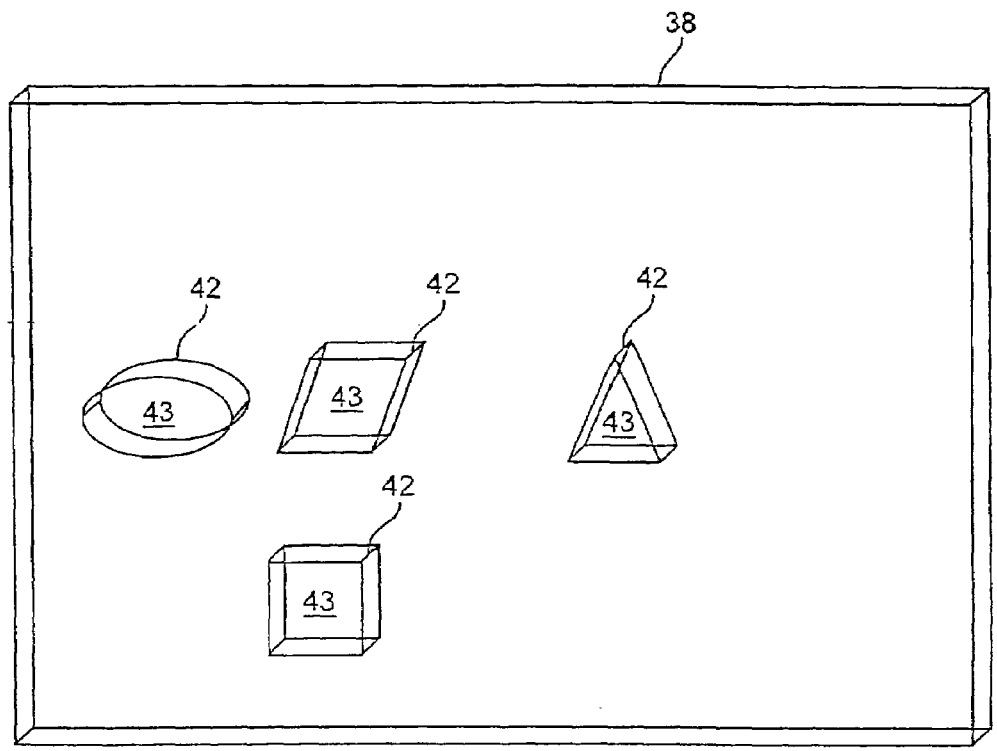
FIG. 16 illustrates schematically alternative track patterns utilized by the embodiments of the present invention.
Figure 17A:
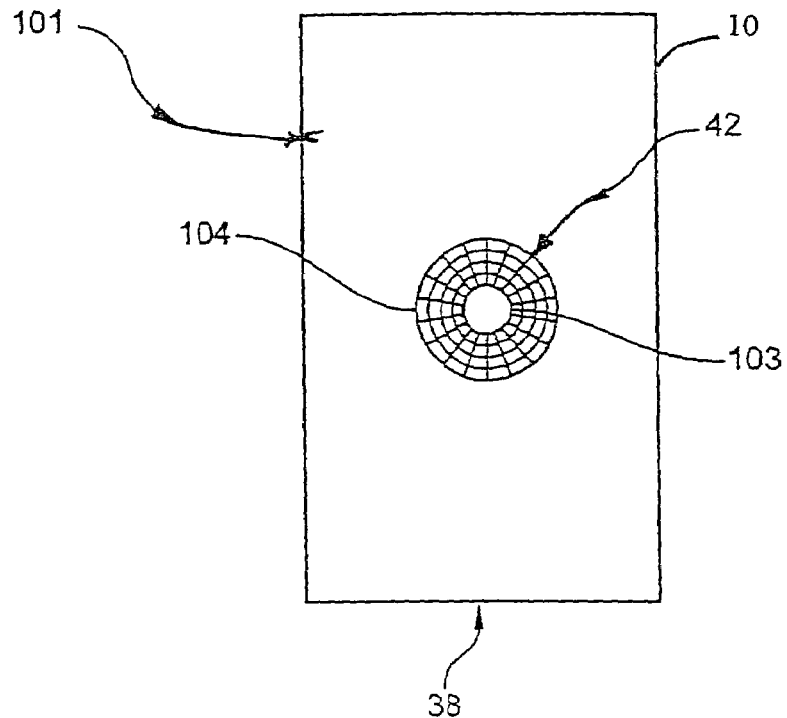
FIGS. 17A–17B illustrate schematically other embodiments of the invention.
Figure 17B:
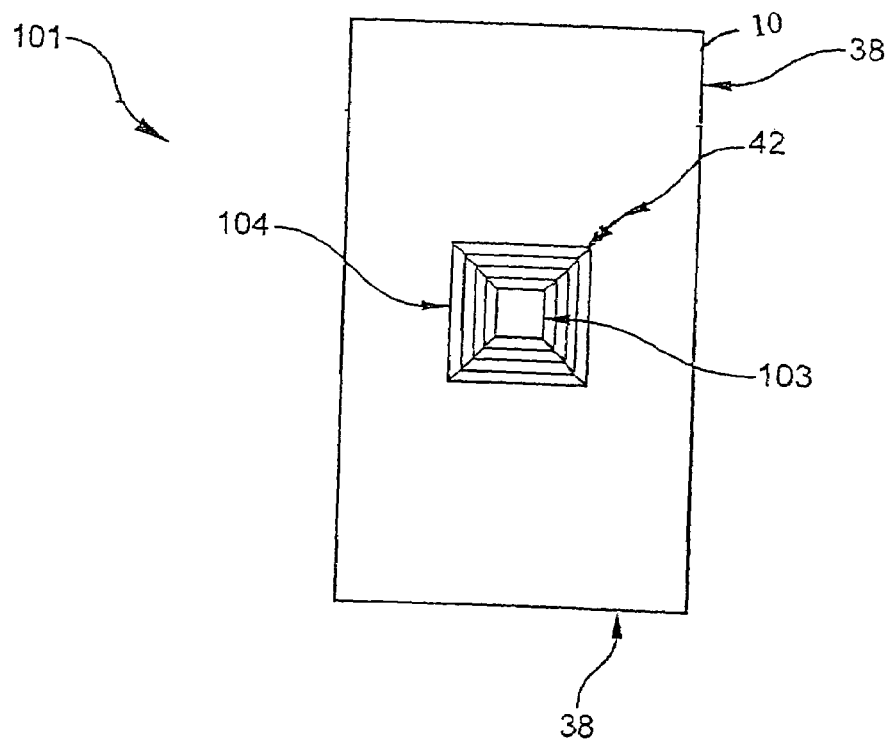

In an alternative embodiment the outline shell hole track pattern can have a non-circular cross section shape such as a triangle, square, rectangle, diamond and oval cross section shape such as shown in FIG. 16. The outline shell hole track pattern may have a progressively varying swelled middle cross-section. Preferably the provided optically transparent has a first surface and a second distal surface and a thickness middle between said first and second surfaces with the outline shell hole track having an expanding cross-section with the expanding cross-section expanding from a minimum cross-section (for example, proximate at least one of the surfaces) to a maximum cross-section (proximate the thickness middle). The progressively varying cross section outline shell hole track 42 of FIG. 17B has a minimum cross-section 103 proximate to at least one glass body surfaces 101 and a maximum cross-section 104. As shown in FIG. 17A, the expanding cross-section outline shell hole track 42 can be formed by tracing circles in successive parallel planes, such as tracing a first circle by translating the stage and glass body in a circular motion then moving the focus (translating stage) further into the glass and tracing a second circle by translating the stage and glass body, and continuing with successive circles with the diameter of the circles traced expanding or contracting as the laser focus progresses deeper into the glass body toward the thickness middle. As shown in FIG. 17B, the expanding outline shell hole track 42 may have a non-circular cross-section, such as shown in FIG. 16. This approach may be utilized to create well plates with arrays of indentations or cups that cross-sections of varying sizes (top to bottom).

The laser traced outline shell hole track pattern may include a fiber funnel tapered section proximate the first surface and the minimum cross-section is proximate the second distal surface. Preferably the glass has a bulk glass thickness of at least 0.25 mm between the surfaces. Preferably the laser traced outline shell hole track pattern expanding cross-section has a circular geometry. However, the expanding cross-section may have a straight-sided geometry such as a triangle, a rectangle, a square, or a diamond.

The present invention enables drilling of holes of predefined size with fine spatial accuracy in glass and other optically transparent materials. The shape of the laser track pattern (exposed hole track pattern) may be virtually any shape traceable with the laser beam, while the depth and the aspect ratio of the final form hole is further determined by the specific application. An advantage of the invention is the ability to perform micromachining of thick samples (up to several millimeters), preferably in thick bulk glass bodies with greater than submillimeter thickness, preferably glass body thickness of at least about 2 mm. This method can be applied to a wide variety of materials that are transparent at the exposing laser wavelength of the irradiating laser producing with subpicosecond region laser pulse duration. As stated above, preferably the laser sources of the invention produce sufficient pulse energy (around 4 $\mu$J or more) and the laser pulse duration being in the subpicosecond region, most preferably below 100 fs.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. A method of making at least one hole through an optically transparent body, said method comprising:
   providing an ultrashort pulse laser for producing a laser output with a wavelength $\lambda$, said laser output having a subpicosecond laser pulse duration;
   providing a laser output focusing lens for focusing said laser output, said focusing lens having a numerical aperture NA;
   providing an optically transparent body, optically transparent body having a transparency at $\lambda$ of at least 90%/cm;
   providing a liquid filled container situated proximate to at least a portion of said optically transparent body, such that said optically transparent body is in direct contact with said liquid; and
   directing said laser output through said focusing lens to produce a focused laser output with a subpicosecond laser pulse duration proximate said optically transparent body, said focused laser output tracing at least one hole track pattern through said transparent glass body while said optically transparent body and said focused laser output move relative to one another in X-Y-Z directions;
   wherein said at least one hole track pattern is in contact with said liquid and wherein said focused laser output in conjunction with said liquid create at least one hole in said optically transparent body.

2. The method of claim 1 wherein said hole track pattern has a width of at least 22 $\mu$m.

3. The method of claim 2 wherein said hole track pattern has a width of at least 50 $\mu$m.

4. The method of claim 3 wherein said hole track pattern has a width between 75 $\mu$m and 200 $\mu$m.

5. The method of claim 1, wherein said method further includes the steps of: providing a controllable positioning translation stage; positioning said optically transparent body within said stage: and translating said optically transparent body relative to location of said focused laser output.

6. The method of claim 1 wherein the speed of movement of said focused laser output relative to said optically transparent body is at least 10 $\mu$m/s.

7. The method of claim 6 wherein the speed of movement of said focused laser output relative to said optically transparent body is in the range of 50 $\mu$m/s to 250 $\mu$m/s.

8. The method according to claim 1, wherein pulse energy is at least 4 $\mu$j.

9. The method of claim 1 wherein said optically transparent body comprises material selected from a group consisting of glass, glass-ceramic and sapphire.

10. The method of claim 9 wherein said glass body is an oxide glass body.

11. A method as claimed in claim 1, wherein providing an optically transparent body includes providing a silica glass with at least 100 ppm wt. OH.

12. A method as claimed in claim 1, wherein providing an transparent body body includes providing a silica glass with at least 500 ppm wt. OH.

13. A method as claimed in claim 1, wherein providing an transparent body body includes providing an uncerammed glass-ceramic glass.

14. A method as claimed in claim 13, wherein providing an uncerammed glass-ceramic glass is selected from a group consisting of an aluminosilicate glass green body, a glass which is cerammable into a negative thermal expansion glass-ceramic body, and a photosensitive nucleated glass.

15. The method of claim 1 wherein said liquid includes at least one of the following: (i) water, (ii) surfactant; (iii) methanol; (iv) acetone.

16. The method of claim 9, further including the steps of inserting an optical fiber-into said hole, thereby providing a glass body with a hole containing optical fiber.

17. The method of claim 1, wherein said focused laser output in conjunction with said liquid create a plurality of holes in said optically transparent body.

18. The method of claim 17, said method including the steps of inserting an optical fiber-into each of said holes of said glass body.

19. A method as claimed in claim 1, wherein providing said ultrashort pulse laser includes providing a <100 fs pulse laser for producing a laser output having a <100 fs laser pulse duration.

20. A method as claimed in claim 1, wherein providing said ultrashort pulse laser provides a laser output having a <50 fs laser pulse duration.

21. A method as claimed in claim 1, wherein providing said ultrashort pulse laser produces a laser output having a $\leqq 40$ fs laser pulse duration.

22. A method as claimed in claim 1, wherein providing said ultrashort pulse laser produces a laser output having a $\geqq 5$ µJ pulse.

23. A method as claimed in claim 1, wherein providing an optically transparent body is an oxide bulk glass body with a $\lambda$ transparency $\geqq 95\%$/cm.

24. A method as claimed in claim 1, wherein providing said ultrashort pulse laser includes providing a $\lambda$<1000 nm laser.

25. A method as claimed in claim 24, wherein said wavelength $\lambda$ is in the range of 800±100 nm.

26. A method as claimed in claim 25, wherein $\lambda$ is centered about 800 nm.

27. An optical device made by the method of claim 1.

28. A method as claimed in claim 1, wherein said hole track pattern through said oxide glass body comprises an outline shell hole track which surrounds an unexposed center glass volume which is detached from said oxide glass body to provide said hole.

29. A method as claimed in claim 28 wherein said outline shell hole track has a circular cross-section.

30. A method as claimed in claim 22 wherein said outline shell hole track has a divided circular cross-section.

31. A method as claimed in claim 28 wherein said outline shell hole track has a varying cross-section.

* * * * *